United States Patent
Forrest

(10) Patent No.: US 10,232,769 B2
(45) Date of Patent: Mar. 19, 2019

(54) VEHICLE CUP HOLDER ASSEMBLY

(71) Applicant: Ford Global Technologies, LLC, Dearborn, MI (US)

(72) Inventor: Jeffery Forrest, Spotswood (AU)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 14/150,273

(22) Filed: Jan. 8, 2014

(65) Prior Publication Data

US 2015/0191116 A1    Jul. 9, 2015

(51) Int. Cl.
| | |
|---|---|
| *F21V 7/00* | (2006.01) |
| *B60Q 3/64* | (2017.01) |
| *B60N 3/10* | (2006.01) |
| *B60Q 3/20* | (2017.01) |

(52) U.S. Cl.
CPC ............... *B60Q 3/64* (2017.02); *B60N 3/101* (2013.01); *B60Q 3/20* (2017.02)

(58) Field of Classification Search
CPC .......... B60Q 3/0243; B60Q 3/64; B60Q 3/20; B60Q 3/101
USPC ........................................ 362/488, 509, 516
See application file for complete search history.

(56) References Cited

U.S. PATENT DOCUMENTS

| | | | |
|---|---|---|---|
| 2008/0266853 A1* | 10/2008 | Goto ............................. | 362/240 |
| 2011/0037287 A1* | 2/2011 | Penner ......................... | 296/37.8 |
| 2013/0294105 A1* | 11/2013 | Reuschel ...................... | 362/558 |

FOREIGN PATENT DOCUMENTS

| | | |
|---|---|---|
| DE | 202005004257 | 5/2005 |
| JP | 2006111101 | 4/2006 |
| KR | 20120118930 | 10/2012 |

* cited by examiner

*Primary Examiner* — Anh T Mai
*Assistant Examiner* — Meghan K Ulanday
(74) *Attorney, Agent, or Firm* — Vichit Chea; Price Heneveld LLP

(57) ABSTRACT

A vehicle cup holder assembly is provided and includes a cup holder. A cup holder bezel is coupled to the cup holder and has an optical element that receives light and a reflective element that partially encloses the optical element and redirects light propagating inside the optical element, wherein light escapes through a light transmissive region of the optical element.

14 Claims, 6 Drawing Sheets

US 10,232,769 B2

VEHICLE CUP HOLDER ASSEMBLY

FIELD OF THE INVENTION

The present invention generally relates to vehicle cup holders, and more particularly to vehicle cup holders with integrated ambient lighting.

BACKGROUND OF THE INVENTION

Vehicle cup holders with integrated ambient lighting can have complex designs, often requiring a relatively large amount of components, which can take up vehicle space and increase vehicle cost. Thus, there is a need for a vehicle cup holder capable of providing ambient light while benefiting from simple construction.

SUMMARY OF THE INVENTION

According to one aspect of the present invention, a vehicle cup holder assembly is provided and includes a cup holder defining an interior volume. A cup holder bezel is coupled to the cup holder and includes at least one light splitter configured to split an incoming light, an optical element for receiving the incoming light from the at least one light splitter and propagating the incoming light, a reflective element for redirecting the incoming light propagating inside the optical element, and a light transmissive region for discharging the incoming light from the optical element to illuminate the interior volume of the cup holder.

According to another aspect of the present invention, a vehicle cup holder assembly is provided and includes a cup holder. A cup holder bezel is coupled to the cup holder and includes an optical element configured to receive and propagate an incoming light, a reflective element coupled to the optical element and configured to redirect the incoming light propagating inside the optical element, and a light transmissive region for discharging the incoming light from the optical element to illuminate the cup holder.

According to another aspect of the present invention, a vehicle cup holder assembly is provided and includes a cup holder. A cup holder bezel is coupled to the cup holder and has an optical element that receives light and a reflective element that partially encloses the optical element and redirects light propagating inside the optical element, wherein light escapes through a light transmissive region of the optical element.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
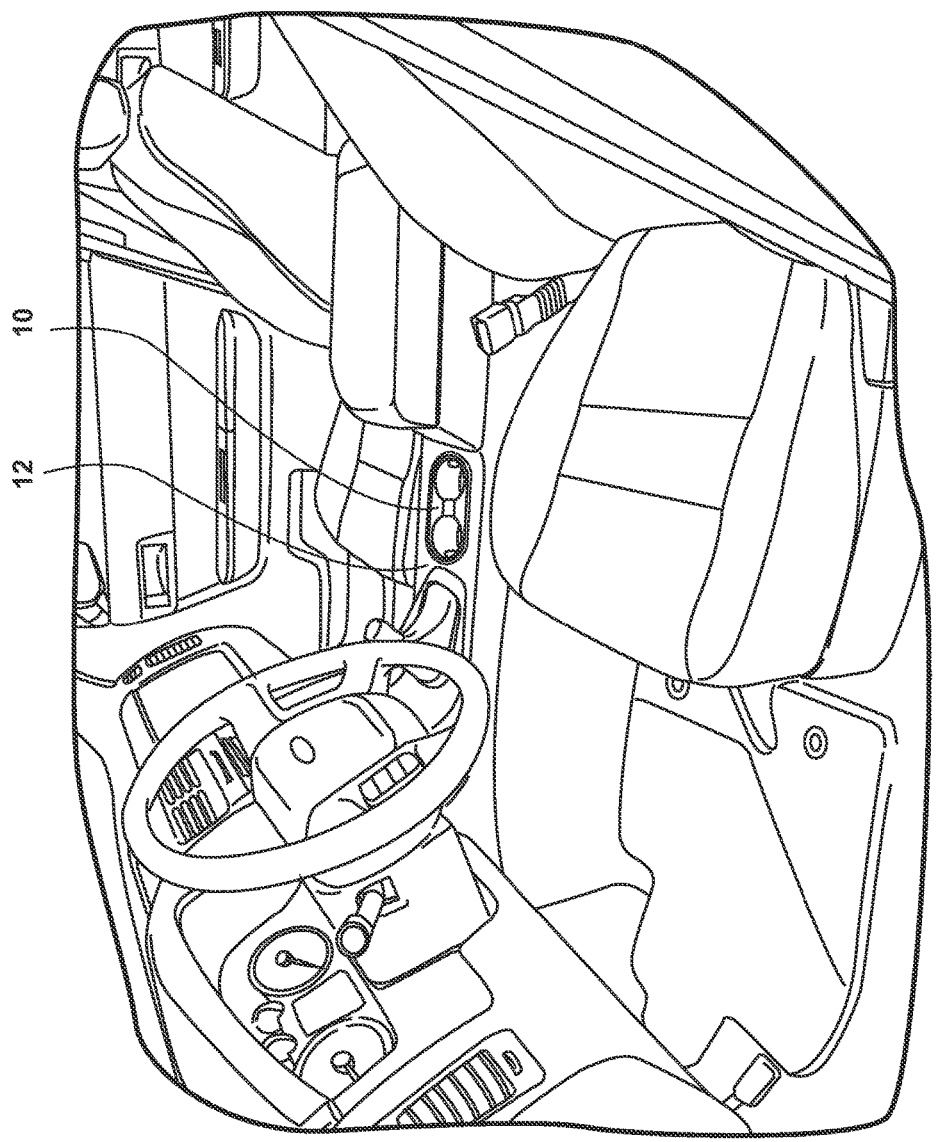
FIG. 1 shows a vehicle cup holder mounted to a vehicle center console.
Figure 2:
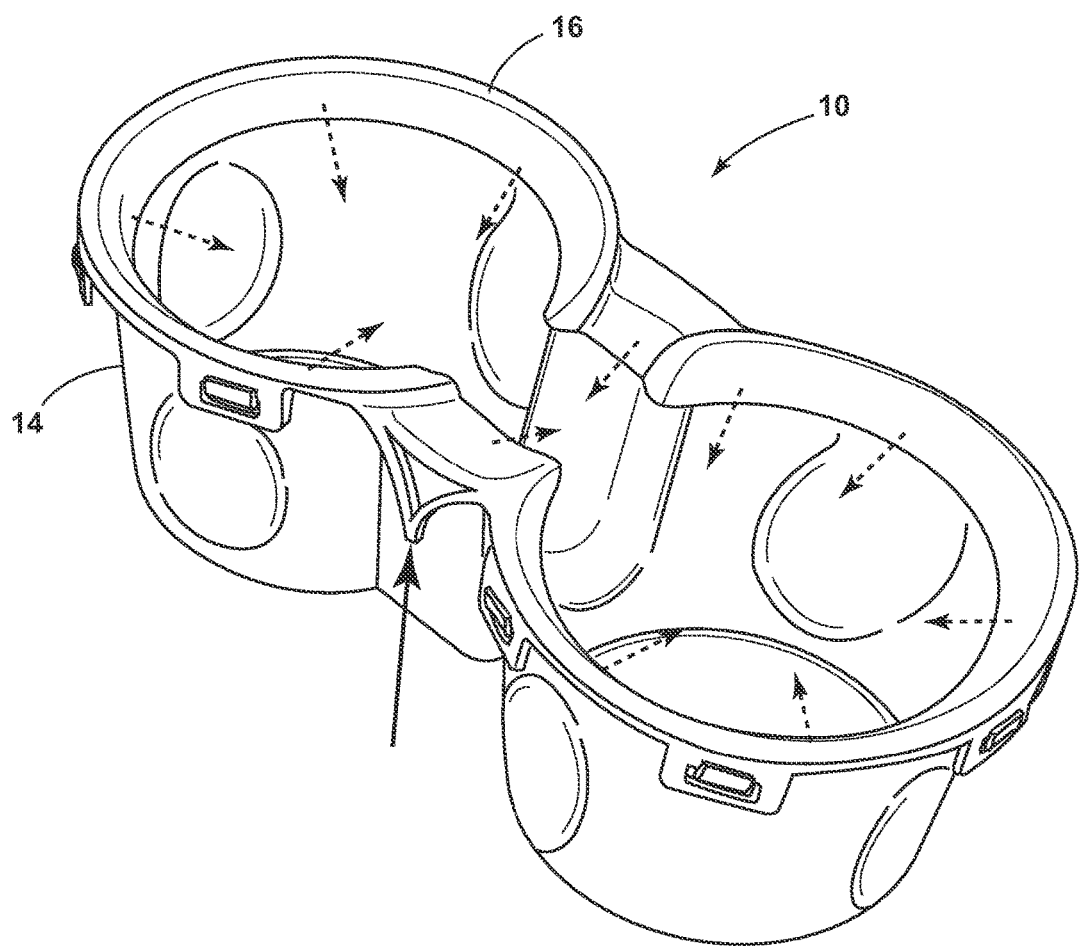
FIG. 2 is a top perspective view of a cup holder assembly according to one embodiment.

In reference to FIGS. 1 and 2, a cup holder assembly 10 is generally shown at reference identifier 10 according to one embodiment. The cup holder assembly 10 is generally intended for use inside a vehicle and is exemplarily shown located in a vehicle center console 12. However, it should be appreciated that the cup holder assembly 10 may be located in other areas of a vehicle that are viewable and accessible to a vehicle passenger. The vehicle cup holder assembly 10 includes a cup holder 14 and a cup holder bezel 16. The cup holder bezel 16 is coupled to the cup holder 14 and is configured to receive an incoming light, shown as a solid arrow. As will be described in greater detail below, the cup holder bezel 16 is configured such that the incoming light is propagated inside the cup holder bezel 16 and is discharged from the cup holder bezel 16, as shown by dashed arrows, to illuminate the inside of the cup holder 14. The resulting illumination may be enjoyed as ambient lighting and may also provide a user with a lighted visual of the cup holder assembly 10 during dark conditions.

Figure 3:
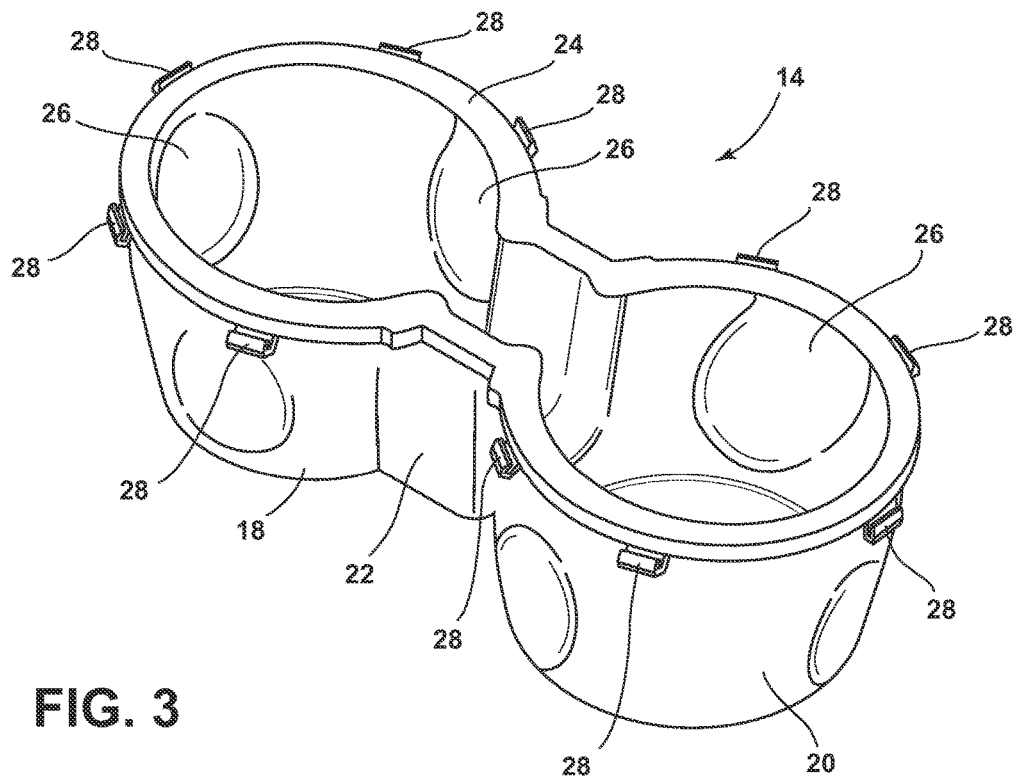
FIG. 3 is a top perspective view of a cup holder according to one embodiment.
Figure 4:
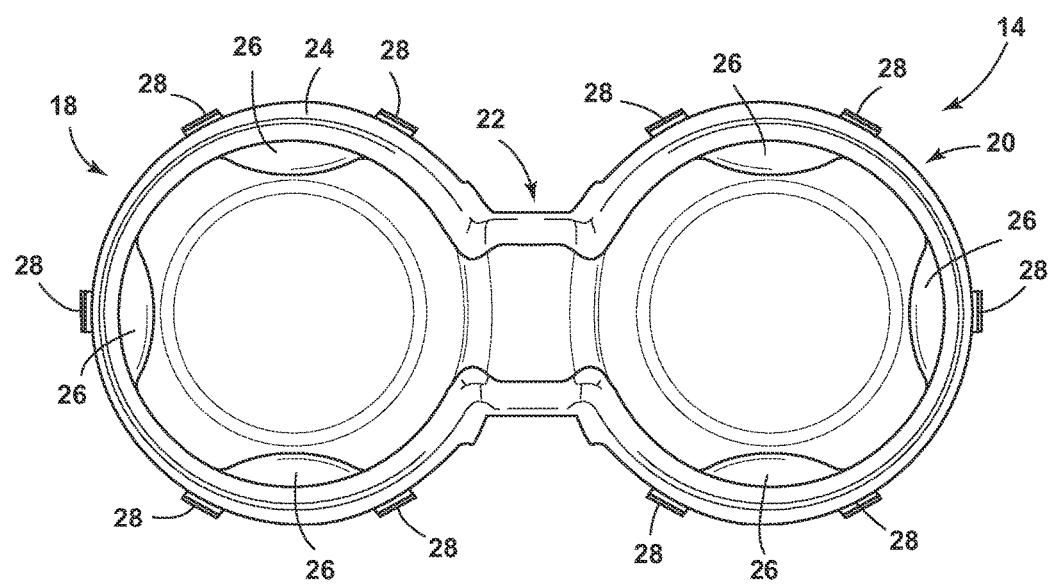
FIG. 4 is a top view of the cup holder shown in FIG. 3.

In reference to FIGS. 3 and 4, the cup holder 14 is shown according to a dual cup configuration, but may also be configured to hold a single cup or more than two cups. The cup holder 14 may be constructed from a rigid or flexible material and may be configured in a variety of shapes, sizes and colors. The cup holder 14 includes a first cup holder 18 connected to a second cup holder 20 via a channeled intermediate section 22. In this configuration, the first cup holder 18, the second cup holder 20, and the intermediate section 22 collectively define an interior volume of the cup holder 14 and a continuous top edge 24 for supporting the cup holder bezel 16. As is further shown in FIGS. 3 and 4, each cup holder 18, 20 may include rounded projections 26 to assist with holding a cup that has been received in the cup holder 18, 20. Additionally, each cup holder 18, 20 may include flanges 28 for engaging the cup holder bezel 16, which will now be described in further detail.

Figure 5:
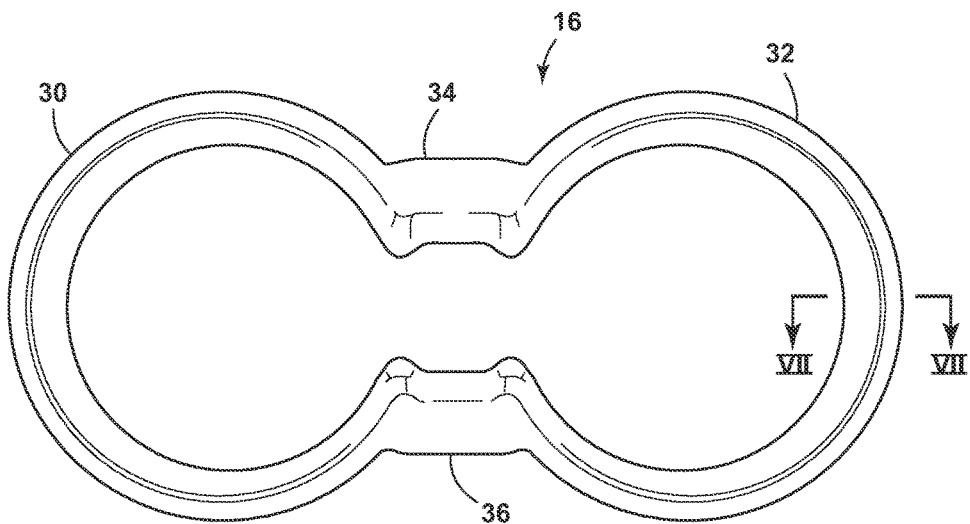
FIG. 5 is a top view of a cup holder bezel according to one embodiment.
Figure 6:
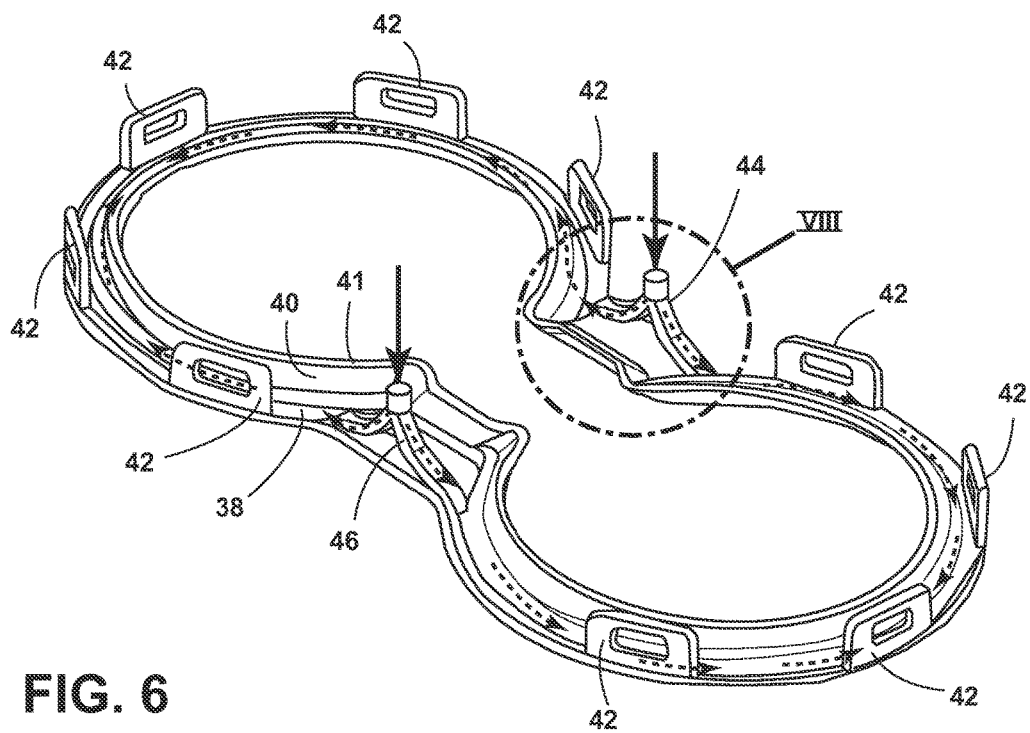
FIG. 6 is bottom perspective view of the cup holder bezel shown in FIG. 5.

In reference to FIGS. 5-8, the cup holder bezel 16 is shown according to one embodiment designed to complement the cup holder 14 previously shown in FIGS. 3 and 4. As shown in FIG. 5, the cup holder bezel 16 is configured as a continuous structure defined by a first ring 30 connected to a second ring 32 via intermediate members 34 and 36 to mirror the contour of the cup holder 14. In FIG. 6, the cup holder bezel 16 is shown upside down and includes a continuous upper portion 38 and a continuous lower portion 40. The upper portion 38 is configured to be supported by the top edge 24 of the cup holder 14 while the lower portion 40 extends inwards relative to the upper portion 38 of the cup holder bezel 16 and includes a lower edge 41 that overhangs the cup holder 14 when the cup holder bezel 16 is mounted thereto. To secure the cup holder bezel 16 to the cup holder 14, the cup holder bezel 16 may include downward extending tabs 42, each having a slit configured to receive one of the flanges 28 of the cup holder 14.

As is further shown in FIG. 6, the cup holder bezel 16 also includes light splitters 44 and 46 disposed opposite one another and coupled to the underside of the upper portion 38. Each light splitter 44, 46 is configured to split an incoming light, shown as a solid arrow, in opposing directions to provide an even light distribution throughout the cup holder bezel 16. Those having ordinary skill in the art will recognize a variety of ways in which light splitters 44 and 46 may receive the incoming light. For example, the incoming light may be supplied to each light splitter via a corresponding light emitting diode (LED) or other light source provided externally from or otherwise integrated with each of the light splitters 44, 46. While light splitters 44 and 46 are shown in a bifurcated configuration, it should be appreciated that other configurations may be similarly implemented. It should also be appreciated that a different number of light splitters may be used and the location for any given light splitter along the cup holder bezel 16 may vary.

Figure 7:
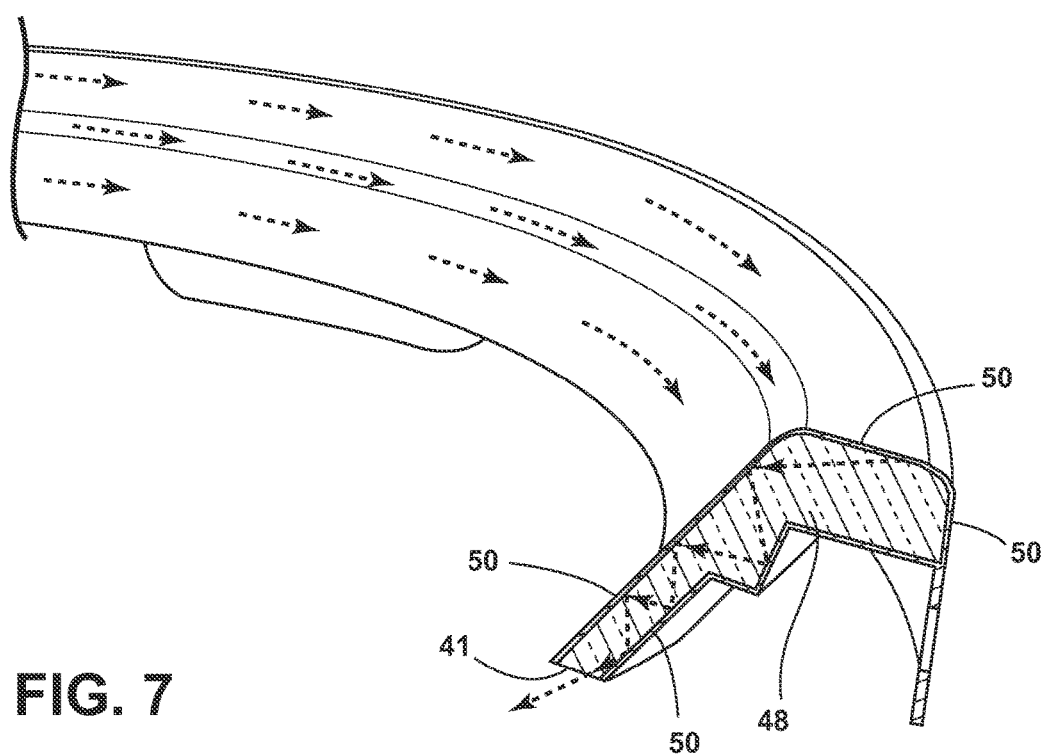
FIG. 7 is a cross sectional view of the cup holder bezel taken along lines VII-VII of FIG. 5, according to one embodiment.
Figure 8:
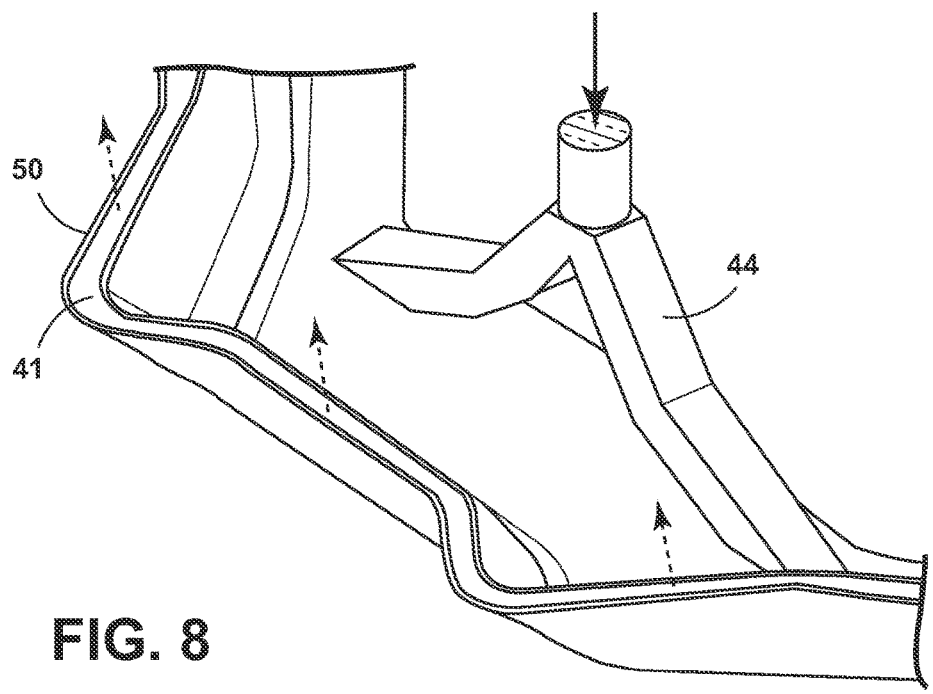
FIG. 8 is an enlarged view of the area enclosed by broken lines VIII of FIG. 6.

As best shown in FIGS. 7 and 8, the cup holder bezel 16 includes an optical element 48 for receiving the incoming light from the light splitters 44, 46 and propagating the incoming light within the cup holder bezel 16. The optical element 48 may include a light transmissive material such as optical grade polycarbonate and may be constructed via thermoforming or other suitable methods. The cup holder bezel 16 also includes a reflective element 50 for redirecting the incoming light propagating inside the optical element 48. The reflective element 50 may be deposited on the optical element 48 as a reflective paint, a hot foil, a physical vapor deposition (PVD) coating, a chrome coating, or other suitable coating. In this manner, the reflective element 50 may be configured to not only redirect the incoming light as described above, but also impart decorative qualities to the cup holder bezel 16.

Figure 9:
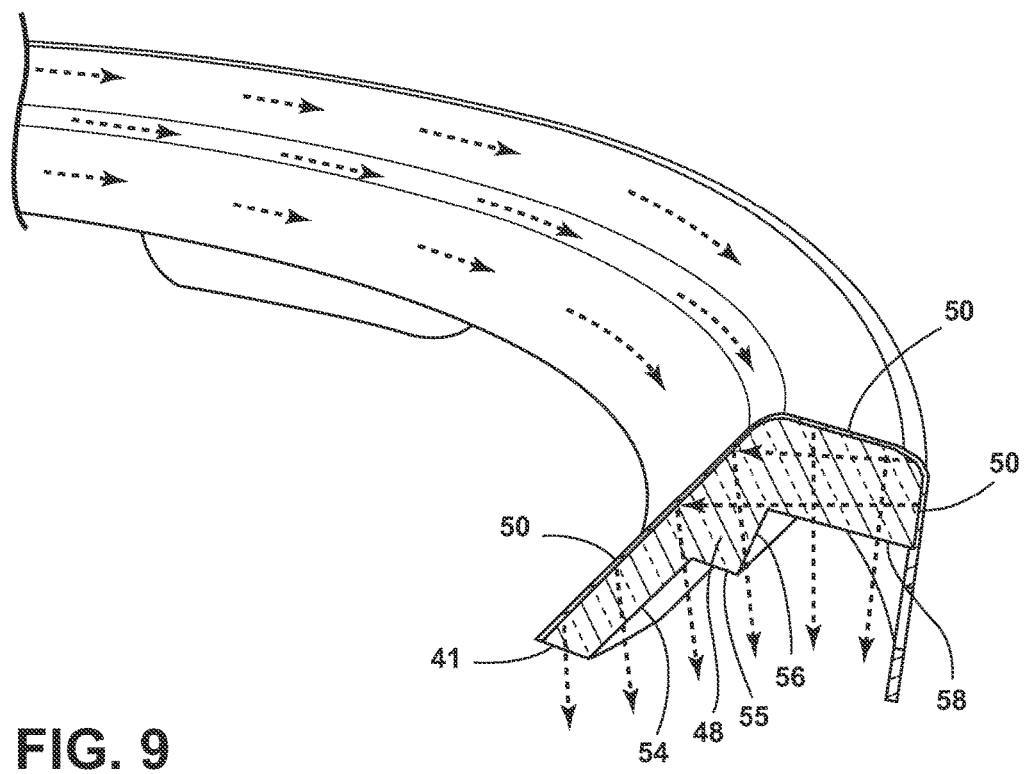
FIG. 9 is an alternative embodiment of the cup holder bezel shown in FIG. 7.
Figure 10:
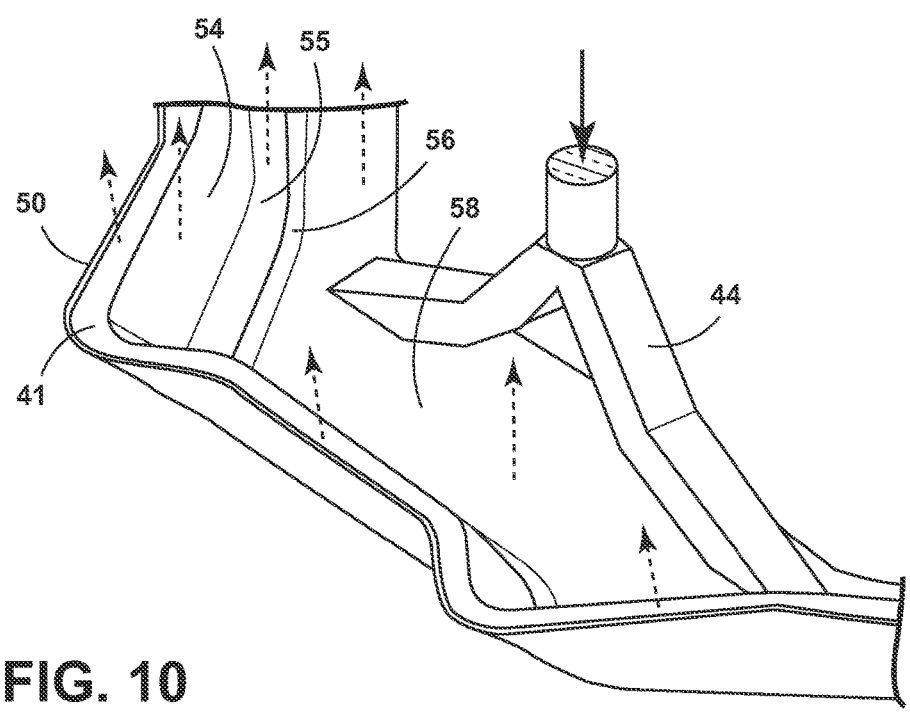
FIG. 10 is an alternative embodiment of the cup holder bezel shown in FIG. 8.

According to the embodiment shown in FIGS. 7 and 8, the reflective element 50 encloses the optical element 48 except for a light transmissive region corresponding to a selected area of the optical element 48. In the present case, the light transmissive region corresponds to the lower edge 41 of the lower portion 40 of the cup holder bezel 16 and extends continuously along a contour of the cup holder bezel 16. According to an alternative embodiment shown in FIGS. 9 and 10, the light transmissive region may correspond to a larger underside portion of the cup holder bezel 16 defined by edges 41, 54, 55, 56, and 58 of the optical element 48. In both cases, the reflective element 50 serves to redirect the incoming light (shown as dashed arrows) such that some of the incoming light continues to propagate through the optical element 48 while some of the incoming light is redirected towards the light transmissive region of the cup holder bezel 16. Upon reaching the light transmissive region, the incoming light is discharged from the cup holder bezel 16 to illuminate the interior volume of the cup holder 14.

Accordingly, a cup holder assembly 10 has been provided herein that advantageously employs a decorative cup holder bezel 16 capable of providing ambient lighting. The cup holder assembly 10 benefits from simple construction and requires minimal parts. As a result, the cup holder assembly 10 may be manufactured at a relatively low cost.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle cup holder assembly comprising:
a cup holder defining an interior volume; and
a bezel coupled to the cup holder and comprising:
an optical element;
at least one bifurcated light splitter having a first branch and a second branch each extending downwardly into the cup holder from the optical element and configured to split a light therebetween and supply the light in an upward direction away from the cup holder to the optical element;
a reflective element for redirecting light propagating inside the optical element; and
a light transmissive region for discharging light from the optical element to illuminate the interior volume of the cup holder.

2. The vehicle cup holder assembly of claim 1, further comprising a light source for supplying light to the first and second branches of the at least one light splitter.

3. The vehicle cup holder assembly of claim 1, wherein the first and second branches supply light to the optical element in opposite directions.

4. The vehicle cup holder assembly of claim 1, wherein the light transmissive region is located on an underside of the bezel that overhangs the cup holder.

5. The vehicle cup holder assembly of claim 1, wherein the reflective element partially encloses the optical element and comprises one of a reflective paint, a hot foil, a physical vapor deposition (PVD) coating, and a chrome coating.

6. A vehicle cup holder assembly comprising:
a cup holder; and
a bezel coupled to the cup holder and comprising:
an optical element for propagating light therein;
at least one bifurcated light splitter having a first branch and a second branch each coupled to an underside of the optical element and extending downwardly therefrom and into the cup holder; wherein the first and second branches are configured to supply a light to the optical element in an upward direction after first splitting the light therebetween;
a reflective element for redirecting light propagating inside the optical element; and
a light transmissive region for discharging light from the optical element.

7. The vehicle cup holder assembly of claim 6, wherein the first and second branches supply light to the optical element in opposite directions.

8. The vehicle cup holder assembly of claim 6, wherein the light transmissive region is located on an underside of the bezel that overhangs the cup holder.

9. The vehicle cup holder assembly of claim 6, wherein the reflective element partially encloses the optical element and comprises one of a reflective paint, a hot foil, a physical vapor deposition (PVD) coating, and a chrome coating.

10. A bezel of a vehicle cup holder assembly, comprising:
   an optical element;
   a bifurcated light splitter having a first branch and a second branch each extending downwardly into the cup holder from the optical element and configured to split an incoming light therebetween and supply the light in an upward direction away from the cup holder to the optical element;
   a reflective element for redirecting light propagating inside the optical element; and
   a light transmissive region for discharging light from the optical element.

11. The bezel of claim 10, wherein the first and second branches supply light to the optical element in opposite directions.

12. The bezel of claim 10, wherein the incoming light is supplied to the light splitter by a light located below the bezel.

13. The bezel of claim 10, wherein the light transmissive region is located on an underside of the bezel that overhangs the cup holder.

14. The bezel of claim 10, wherein the reflective element partially encloses the optical element and comprises one of a reflective paint, a hot foil, a physical vapor deposition (PVD) coating, and a chrome coating.

* * * * *

UNITED STATES PATENT AND TRADEMARK OFFICE
CERTIFICATE OF CORRECTION

PATENT NO.         : 10,232,769 B2
APPLICATION NO.    : 14/150273
DATED              : March 19, 2019
INVENTOR(S)        : Forrest Page 1 of 1

It is certified that error appears in the above-identified patent and that said Letters Patent is hereby corrected as shown below:

In the Claims

Column 4:
Claim 6, Line 59:
After "direction" insert --away from the cup holder--.

Signed and Sealed this
Twenty-first Day of May, 2019

Andrei Iancu
*Director of the United States Patent and Trademark Office*